United States Patent
Teo et al.

(10) Patent No.: US 7,610,036 B2
(45) Date of Patent: Oct. 27, 2009

(54) SPACE-TIME-FREQUENCY SENSING OF RF SPECTRUM IN COGNITIVE RADIOS

(75) Inventors: Koon Hoo Teo, Lexington, MA (US); Hongyuan Zhang, San Jose, CA (US); Yves-Paul N. Nakache, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 516 days.

(21) Appl. No.: 11/620,759

(22) Filed: Jan. 8, 2007

(65) Prior Publication Data

US 2008/0166974 A1 Jul. 10, 2008

(51) Int. Cl.
*H04B 17/00* (2006.01)
*H04W 72/00* (2006.01)
(52) U.S. Cl. .............. 455/403; 455/67.11; 455/101; 455/450; 455/509; 370/330
(58) Field of Classification Search ............ 455/67.11, 455/101, 450–453, 509; 370/329–330, 334, 370/341
See application file for complete search history.

(56) References Cited

U.S. PATENT DOCUMENTS

| 6,094,425 | A | * | 7/2000 | Auger et al. ............ 370/330 |
| 6,847,678 | B2 | * | 1/2005 | Berezdivin et al. ........ 375/146 |
| 6,990,087 | B2 | * | 1/2006 | Rao et al. .............. 370/330 |
| 2006/0039275 | A1 | * | 2/2006 | Walton et al. ............ 370/208 |
| 2009/0060081 | A1 | * | 3/2009 | Zhang et al. ............. 375/267 |
| 2009/0161610 | A1 | * | 6/2009 | Kang et al. ............. 370/329 |

\* cited by examiner

*Primary Examiner*—Simon D Nguyen
(74) *Attorney, Agent, or Firm*—Dirk Brinkman; Gene Vinokur

(57) ABSTRACT

A method detects unused frequency bands in a cognitive radio network. Multiple frequency bands for RF signals are sensed using an antenna array including a plurality of elements coupled to a receive RF chain, in which the plurality of elements are individually controllable. For each frequency band, multiple spatial directions are sensed for the RF signals using the antenna array. A particular frequency band and a particular direction and a particular time slot are assigned as an available frequency band, an available direction and a particular time slot for transmitting RF signals in a cognitive radio if the RF signals are not sensed in the particular spatial direction for the particular frequency band, and in which the RF signals are transmitted by a transmit chain connected to the antenna array.

19 Claims, 5 Drawing Sheets

US 7,610,036 B2

SPACE-TIME-FREQUENCY SENSING OF RF SPECTRUM IN COGNITIVE RADIOS

FIELD OF THE INVENTION

This invention relates generally to spectrum sensing techniques in cognitive radio (CR) communications systems, and more particularly to CR devices with antenna arrays.

BACKGROUND OF THE INVENTION

In cognitive radio techniques, secondary users (CR transceivers) dynamically change transmit and receive parameters so that their signals do not interfere with signals of primary users (PU transceivers). Conventionally, cognitive radios consider radio frequency spectrum utilization, user behavior, and network state. Cognitive radios are considered in the IEEE 802.15, IEEE 802.19, and IEEE 802.22 standards. Conventionally, cognitive radio techniques conduct one-dimensional spectrum sensing by periodically scanning only the frequency domain to locate unused frequency bands ("spectrum holes"). The unused frequency bands can then be used for CR to transmit signals that do not interfere with the signals of the PUs.

To obtain accurate result, a duration $T_s(f)$ is used by the CR to sense the spectrum at the frequency band f. The sensing can be conducted by directly measuring the of PU signals (power-based sensing), or by analyzing statistics of the signals transmitted by PUs, (intelligent sensing).

Spectrum sensing can be categorized as focal sensing, and cooperative sensing. Local sensing is performed by a single CR. Cooperative sensing is performed by multiple CRs that share results. The performance of local sensing can be sub-optimal due to shadowing and fading. Consequently, "hidden" PUs can exist because a single CR cannot detect the existence of all PUs that can receive interfering signals. In addition, locating a large number of unused frequency bands is better performed cooperatively.

In cooperative spectrum sensing, associated CRs can exchange local sensing results, so that a cognitive network obtains an accurate estimate of unused frequency band, or even, locations of the PUs.

SUMMARY OF THE INVENTION

The embodiments of the invention provide space-time-spectrum sensing for an RF spectrum in cognitive radio (CR). The CR is equipped with an antenna array. As defined herein, an antenna array includes multiple antenna elements. The antenna elements can be controlled individually. The antenna arrays can be used to scan the RF spectrum in frequency, time, and space domains to detect unused frequency bands.

DETAILED DESCRIPTION OF THE PREFERRED EMBODIMENT

CR Network

Figure 1A:
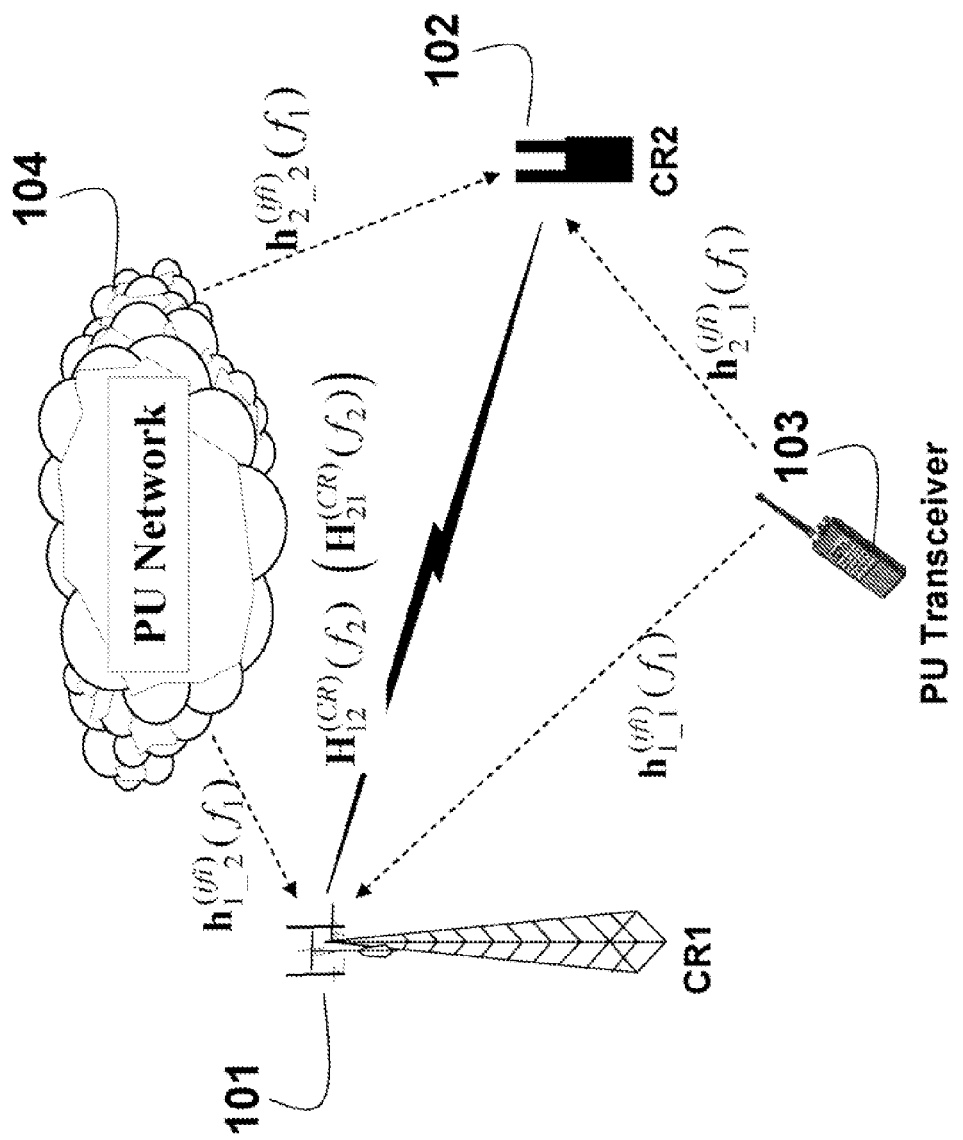
FIG. 1A is a schematic of a cognitive radio network that uses the embodiments of the invention.

FIG. 1A shows radio networks in which the embodiments of our invention operates. The task is to detect unused frequency bands ("spectrum holes" 401 in FIG. 4). The unused frequency bands can then be assigned as available frequency bands for a cognitive radio.

More specifically, we desire to detect the unused frequency bands using cognitive radios equipped with antenna arrays. As defined herein, an antenna array includes multiple antenna elements that can be individually controller over space, time and frequency dimensions.

The networks include a primary user (PU) network 104 and a PU transceiver 103, and secondary users (CR) 101-102. The PUs and CRs are located so that their signals can interfere with each other. As shown, the communication links do not need to be in the form of direct propagations, i.e., line-of-sight (LOS) connections. The embodiments of our invention can be applied to any scattering/fading environment.

As shown in FIG. 1A, two CRs (CR1 101 and CR2 102) desire to communicate with each other. CR1 is an access point (AP) and CR2 is a mobile station (MS). It should be understood that other types of CR transceivers can communicate with each other according to the embodiment of our invention.

The PUs transmit and receive RF signals via a used frequency and $f_1$. The CRs detect an unused frequency band $f_2$. This frequency band that is unused by the PUs is then assigned to the secondary users. The frequency band $f_2$ should not interfere with the frequency band $f_1$.

CR Transceiver

Figure 1B:
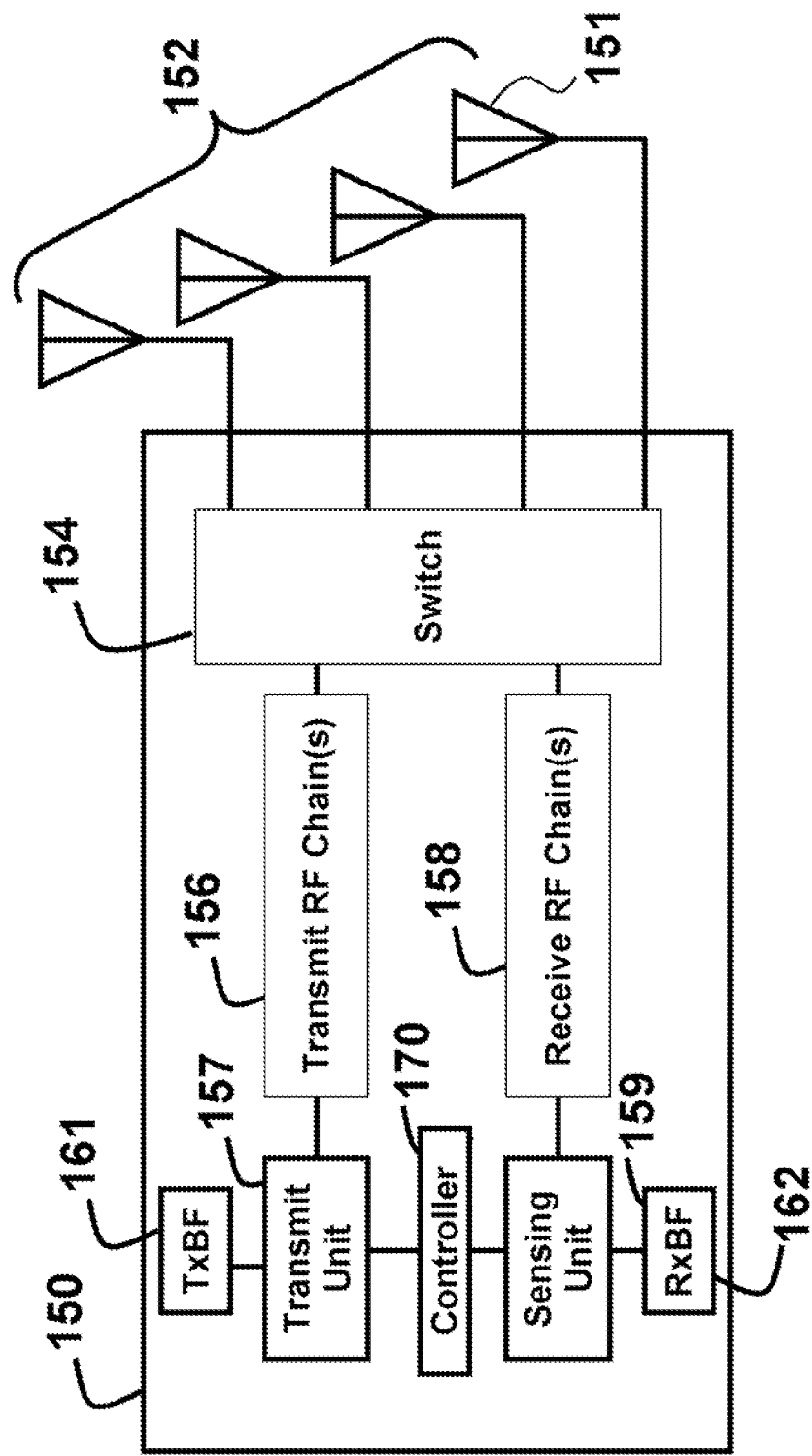
FIG. 1B is a block diagram of a cognitive radio according to an embodiment of the invention.

FIG. 1B shows a cognitive radio (CR) 150 according to an embodiment of our invention. The CR includes an antenna array 152 connected directly, or via a switch 154, to one or more transmit RF chains 156 and receive RV chains 158, which are respectively connected to a transmit unit 157 and a receive unit 159, operating respectively according to a transmit beamforming matrix (TxBF) 161 and a receive beamforming matrix (RxBF) 162. A controller 170 controls overall operations of the various components as described herein.

The antenna array 152 includes multiple antenna elements 151 that can be individually controlled 170 via the RF chains. Depending on the connections between the RF chains and the antenna array, the elements can either transmit, receive or both. As described herein the radio signals transmitted by the antenna elements can vary in space, time and frequency.

Using the beamforming matrices 161-162, the antenna arrays can be "steered" in particular spatial directions. The steering is accomplished by either time shifting in the spatial domain or phase shifting in the frequency domain the RF signals on the individual antenna elements 151. This is called beamforming.

Channel Model

A matrix $H_{kj}^{(CR)}(f)$ represents the CR channel state information (CSI) matrix from CR k to CR j at frequency f. A vector $h_{k...n}^{(ifi)}(f)$ denotes an $n^{th}$ interference channel vector form a particular PU with an index n, detected at CR k at a frequency f. In the case of multiple interfering signals transmitted from one PU, each signal serves as one virtual PU. Hence, the channel vector $h_{k...n}^{(ifi)}(f)$ still applies. We denote $N_{T...k}$ and $N_{R...k}$ as the number of transmit and receive antenna elements of the array 152 at CR k, and $N_{T...k} = N_{R...k} = N_k, \forall k$.

In the CRs, spectrum sensing via the RF chain 158 and data transmission via the RF chain 156 can be conducted in a time-division manner, i.e., alternatively unused frequency bands can be sensed in the time domain, or by different CRs in a cooperative manner in the frequency domain. The results can be formatted and distributed in the frequency domain using a media access control (MAC) layer.

Let $N_{S\_k}$ denote the number of antenna elements at CR k, in a time-division sensing scenario, where $N_{S\_k}=N_k$. The detecting by different CRs, where $N_{S\_k} \neq N_k$ is possible, is described below.

Therefore, the matrix $H_{kj}^{(CR)}(f)$ is of dimension $N_j \times N_k$, while the dimension of the vector $h_{k\_n}^{(ifi)}(f)$ is $N_k 1$. With these settings, the $n^{th}$ sensed signal vector from a PU detected by CR k at frequency f is:

$$y_{k\_n}^{(ifi)}(f) = h_{k\_n}^{(ifi)}(f) x_n^{(ifi)}(f) + v_k(f), \quad (1)$$

where $x_n^{(ifi)}(f)$ is the signal transmitted by the $n^{th}$ PU at frequency f, and the vector $v_k(f)$ represents the additive noise at CR k.

The CR communication link at frequency f can be represented by:

$$y_{kj}^{(CR)}(f) = H_{kj}^{(CR)}(f) T_k(f) x_k(f) + v_j(f), \quad (2)$$

where $x_k(f)$ is the $L_k \times 1$ transmitted vector form CR k, in which $L_k \leq \min(N_k, N_j)$, $T_k(f)$ is the $N_k \times L_k$ transmit beamforming matrix at CR k.

It is possible for a receiver to apply the RxBF matrix 159 before signal detection. This can be expressed by:

$$\begin{aligned} s_{kj}(f) &= R_j(f)^H y_{kj}^{(CR)}(f) \\ &= R_j(f)^H [H_{kj}^{(CR)}(f) T_k(f) x_k(f) + v_j(f)] \\ &= H_{kj}^{(CR)'}(f) T_k(f) x_k(f) + v_j'(f), \end{aligned} \quad (3.1, 3.2, 3.3)$$

where $R_j(f)$ is the $N_j \times L_j$ RxBF matrix 159, $(.)^H$ represents the matrix conjugate transpose $H_{kj}^{(CR)'} = R_j(f)^H H_{kj}^{(CR)}$, the noise vector $v_j'(f) = R_j(f)^H v_j(f)$, and $s_{kj}(f)$ is the $L_j \times 1$ equivalent received vector. Note that Equation (3) is generally similar to Equation (2) other than the details of the modified channel matrix and the noise vector. To correctly recover the transmitted data in $x_k(f)$, $L_j \geq L_k$ is required.

Beamforming

Figure 2:
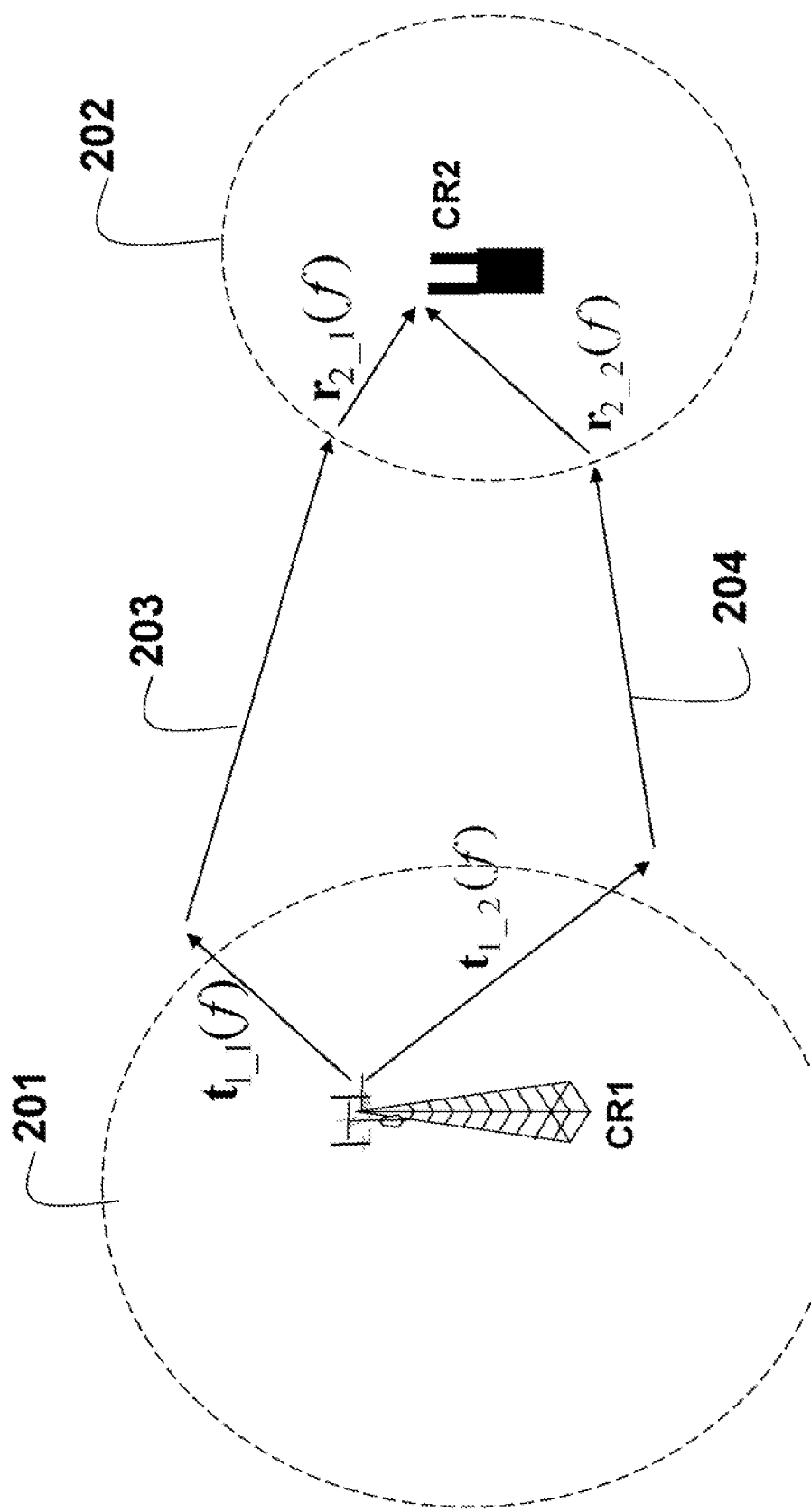
FIG. 2 is a schematic of cognitive beamforming according to an embodiment of the invention.

FIG. 2 shows transmit and receive beamforming, TxBF and RxBF, in scattering/fading channels. Circles 201 and 202 represent respectively areas around CR1 and CR2 where signals can be scattered.

In the case of two-dimensional beamforming, $L_k = L_j = 2$. At the frequency f, the strongest inter-cluster paths, which are orthogonal or non-interfering with each other, are denoted by paths 203 and 204. The transmitter and/or the receiver can select to form their beams corresponding to these two paths, where $t_{k\_i}(f)$ and $r_{k\_i}(f)$ denote the $i^{th}$ transmit and receive beamforming vectors at CR k, respectively.

Therefore, the TxBF matrix 161 and the RxBF matrix 162 can be expressed by:

$$T_k(f) = [t_{k\_1}(f) t_{k\_2}(f) \ldots t_{k\_L_k}(f)], \text{ and } R_j(f) = [r_{j\_1}(f) r_{j\_2}(f) \ldots r_{j\_L_j}(f)]. \quad (4.1, 4.2)$$

It should be noted that any type of beamforming can be used. This includes the case where multiple CRs operate at the same frequency f, and where TxBF and RxBF are used for both multi-user and multi-stream interference reduction at each CR.

Space-Time-Frequency RF Spectrum Sensing

In prior art, one-dimensional local frequency sensing does not consider spatial directions. That is equivalent to sensing with a random-directional receive antenna array or a fixed RxBF matrix.

In space-time-frequency sensing of the RF spectrum sensing according to the embodiments of our invention, an adjustable $N_k \times 1$ RxBF vector $b_k(f)$ is applied at an input to the antenna array 152. The vector $b_k(f)$ is varied over time at different frequency bands using a pre-determined "sweeping route." The values assigned to the vector $b_k(f)$ can vary for different applications.

Figure 3B:
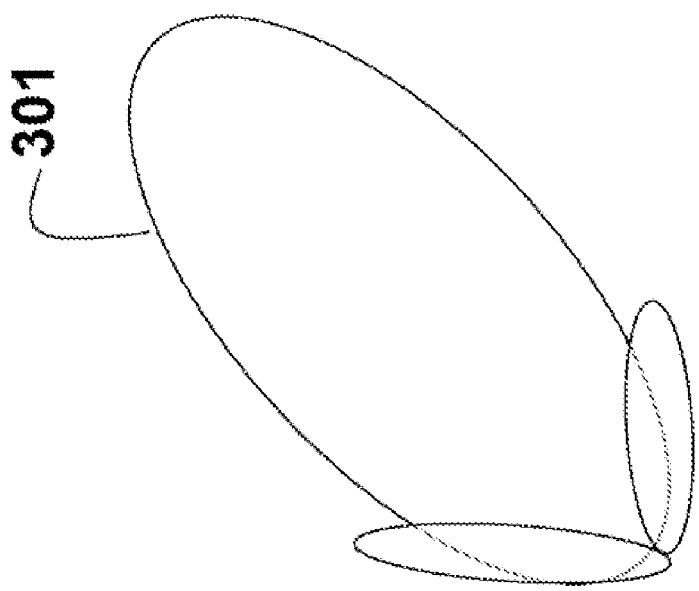
FIG. 3B is an energy pattern of an antenna array corresponding to the vector of FIG. 3A.
Figure 3A:
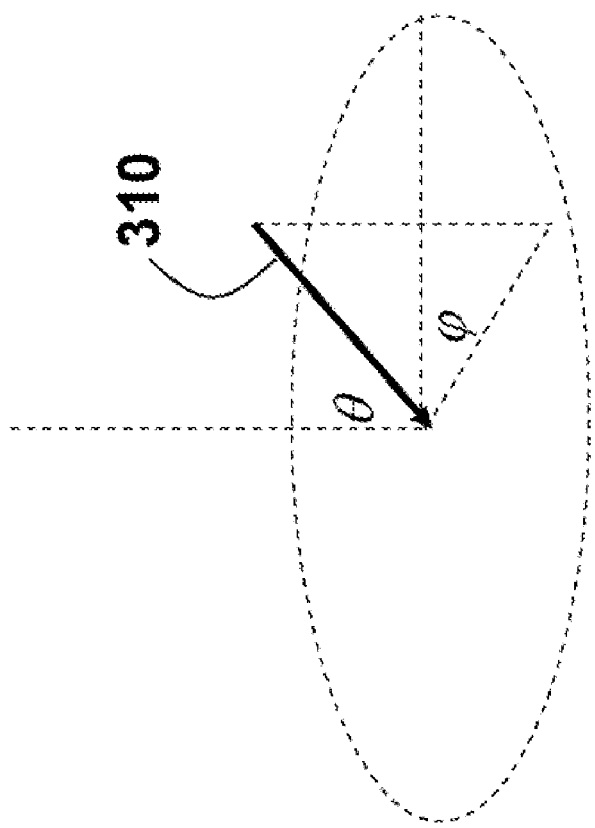
FIG. 3A is a graph of beamforming vector according to an embodiment of the invention.

As shown in FIG. 3A, the vector $b_k(f)$ 310 can be aimed in particular spatial direction according to azimuth and altitude angles $(\theta, \phi)$, when a high spatial sensing resolution is required. FIG. 3B shows the equivalent antenna pattern. In this example, all of the antenna elements are omni-directional. In this case, the beamforming vector b can be expressed as:

$$b_k(f) = \beta(\varphi) \begin{bmatrix} 1 \\ e^{2\pi j \frac{\Delta_k}{\lambda} \cos\theta} \\ \vdots \\ e^{2\pi j (N_k-1) \frac{\Delta_k}{\lambda} \cos\theta} \end{bmatrix}, \quad (5)$$

where $\beta(\phi)$ is a function corresponding to $\phi$, and $\Delta_k$ is the spacing between adjacent antenna elements. Note that the vector $b_k(f)$ in Equation (5) can be varied to provide any spatial setting for the antenna array, and any pattern of each antenna element.

As shown in FIG. 3B, the relatively narrow main lob 301 of the equivalent antenna pattern can result in a larger number of quantized spatial directions to be sensed. Other values in the vector $b_k(f)$ $b_k(f)$ can lead to wider main lobes, which correspond to lower sensing resolution and a reduced number of quantized spatial directions to be sensed.

The space-time-frequency spectrum sensing periodically adjust the vector $b_k(f)$ so that the different frequency bands are sensed in different spatial directions. These directions correspond to different spatial directions of the main lobe 301 of the equivalent antenna pattern. For example, let a set $\Psi_k(f)$ collect the PU signals sensed at CR k in a frequency band f. Then, under the directional antenna array setting of Equation (5), the sensing output at frequency f and direction $(\theta, \phi)$ can be expressed by $$\begin{aligned} a_k(f, \theta, \varphi) &= b_k(f)^H \sum_{n \in \Psi_k(f)} y_{k\_n}^{(ifi)}(f) \\ &= b_k(f)^H \sum_{n \in \Psi_k(f)} (h_{k\_n}^{(ifi)}(f) x_n^{(ifi)}(f) + v_k(f)), \end{aligned} \quad (6)$$

where $\alpha_k(f, \theta, \phi)$ is a time-varying value.

By sensing over a time duration $T_S(f)$, the CR can conduct the conventional spectrum sensing either by power-based or by other intelligent methods. In other words, the time-varying variable $\alpha_k(f, \theta, \phi)$ acts like the observations of conventional CR without considering spatial parameters. Again, the spatial sensing is based on the values in the beamforming vector b(f) 310, or the equivalent antenna pattern 301.

Figure 4:
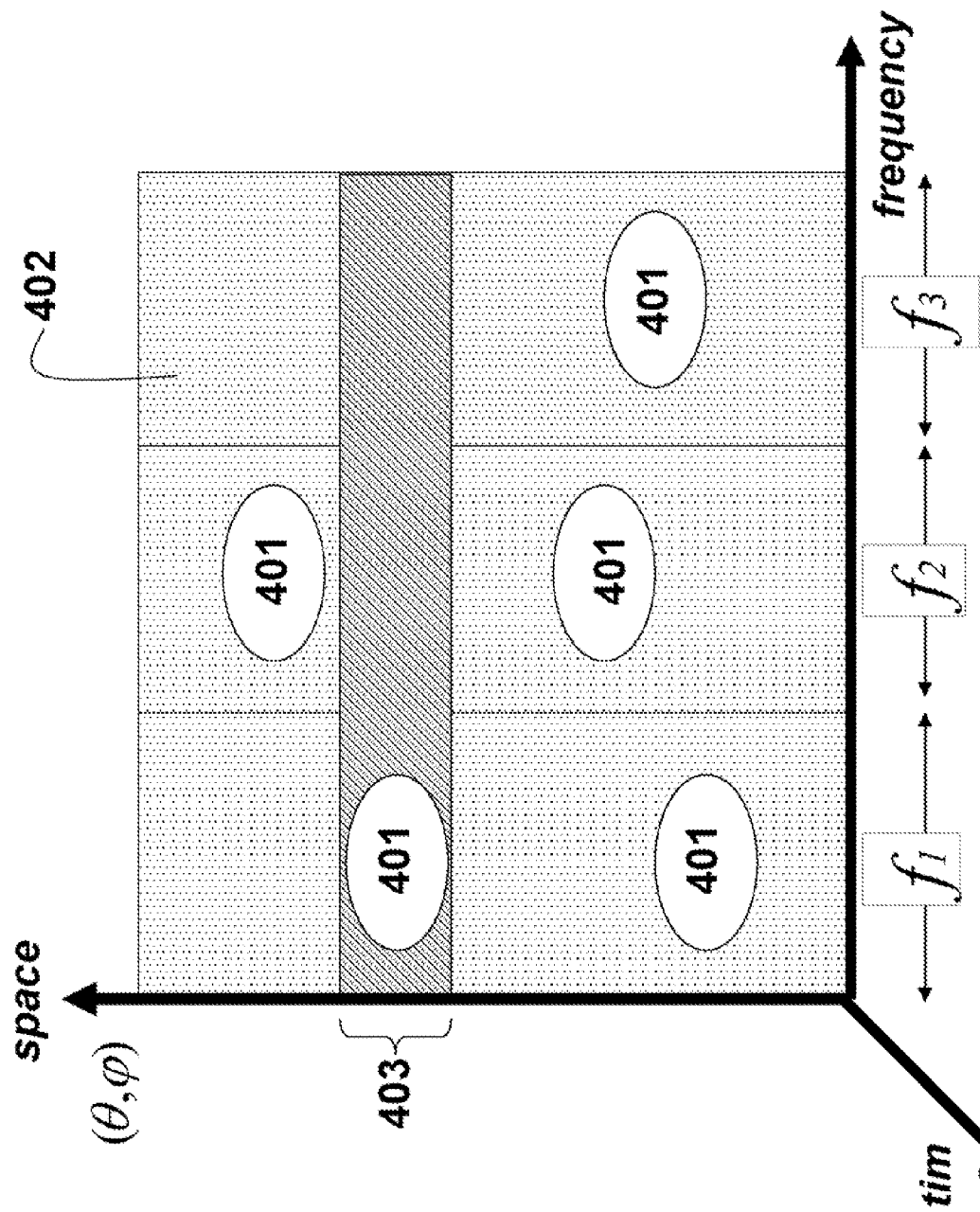
FIG. 4 is a graph of space-time-frequency sensing according to an embodiment of the invention.

Then, as shown in FIG. 4, the CR forms a "map" of the available space-spectrum holes 401, stored in a time varying set $\Gamma_k(f)$ by collecting the current sensing results. FIG. 4 shows an example of our space-spectrum sensing for three frequency bands $f_1 f_2$ and $f_3$, with space along the vertical axis and frequency on the horizontal axis, and time orthogonal to the other two axes. The unused frequency bands are the "holes" 401. The remaining area 402 in the space and frequency plane is, perhaps, used by PU signals sensed by the CR. In FIG. 4, all three frequency bands are occupied, in part, by some PUs.

Without spatial sensing as is done in the prior art, e.g., by using only one omni-directional antenna, the CR will probably not locate any spectrum holes. Also, with a fixed directional antenna as in the prior art, e.g., in the area 403, fewer spectrum holes are detected. Therefore, the space-time-frequency RF spectrum sensing according to the embodiments of our invention locates more available spectrum holes, compared with conventional one-dimensional CR sensing methods.

Additional spectrum holes can be located by sensing over smaller frequency bands. This can be realized, e.g., by sensing one part of the overall reachable bandwidth for the CR at each sensing phase, and then sensing at different parts of the overall frequency bands using different sensing phases. Consequently, space-time-frequency sensing of the RF spectrum does lengthen the sensing duration. Reducing the frequency sensing bandwidth can also simplify the hardware designs.

In the case of space-time-frequency sensing of the RF spectrum using the antenna array 152 of $N_k$ elements 151 at CR k, the CR 150 can concurrently form $N_k$ orthogonal beams according to:

$$B_k(f)=[b_{k\ldots 1}(f), b_{k\ldots 2}(f), \ldots, b_{k\ldots N_i}(f)], \qquad (7)$$

where, the inner product between two vectors $\langle b_{k\ldots m}(f), b_{k\ldots n}(f)\rangle=0$, $\forall m\neq n$, and the beamforming matrix $B_k(f)$ is an $N_k \times N_k$ orthogonal matrix. Then, the RxBF matrix $B_k(f)$ 162 can be directly applied to derive $N_k$ sensing statistics in the form of Equation (6). This decreases the time required for the sensing by a factor of $N_k$.

Cooperative CRs can exchange the sensing results to enable communications on the unused frequency bands. If $\Gamma_k(f)\neq\Phi$, CR k reports an unused frequency f.

Space-Time-Frequency Sensing of the RF Spectrum with Beamforming

The space-time-frequency sensing can be combined with the TxBF 161 and/or the RxBF 162. As described above, without sensing, the transmitter and the receiver can locate the optimal beamforming steering vectors/matrices according to the current channel state, over all possible spatial directions.

The basic idea of our space-time-frequency sensing and beamforming can be described as follows.

The CR k transmits to CF j at a frequency f, i.e., $\Gamma_k(f)\neq\Phi$, $\Gamma_j(f)\neq\Phi$. Therefore, vectors $T_k(f)$ in the TxBF 161 are selected within the detected unused frequency bands $\Gamma_k(f)$. In addition, the CR receiver j should not observe any interference from the PUs. Hence, the RxBF 162 in Equation (3) is applied directly, where the RxBF vectors in $R_j(f)$ are selected within the detected unused frequency bands in $\Gamma_j(f)$.

If $b_{k\ldots 1}(f), \ldots, b_{k\ldots L_k}(f)\in\Gamma_k(f)$, when $T_k(f)=\alpha[b_{k\ldots 1}(f), b_{k\ldots 2}(f), \ldots, b_{k\ldots i_k}(f)]$, then the $n^{th}$ PU will observe weak interference form CR k, because $b_{k\ldots n}^{(jf)}(f)^H T_k(f)\approx 0$.

At CR receiver j, the sensing results, ("space-spectrum holes") imply:

$$b_{j\ldots n}(f)^H h_{j\ldots n}^{(jf)}(f)\approx 0.$$

Hence, there is almost no interference form PU observed at CR j, if the vectors $b_{j\ldots n}(f)^H$ is used for the matrix RxBF 162. Consequently, CRs and PUs can operated in the same frequency bands f without interfering with each other. This can significantly improve the system level efficiency of the CR and PU networks.

According to Equation (3), the matrices TxBF and RxBF can be combined with any other transmitter and/or receiver designs, such in MIMO and/or multi-user systems, where Equation (3.3) represents the equivalent channel model.

In the case of beamforming over pre-determined (quantized) steering vector tables, e.g., by using linear precoding, the spatial sensing is performed over the vectors of the steering tables. Then, the CR can construct a new steering table with a reduced size, i.e., the steering vectors corresponding only to space-spectrum holes. Then, the beamforming can be conducted with this new table. This can reduce the complexity for locating the steering vectors. If the space-time-frequency sensing is not conducted within the original steering table, the updated table contains the steering vectors corresponding to the resultant space-spectrum holes.

Variations

Up to now, we have described electronic "steering" of the antenna arrays using beam forming. However, it should be understood, that the different spatial directions can also be sensed by physically adjusting the azimuth and altitude angles ($\theta$, $\phi$) of the antenna array elements.

The space-time-frequency spectrum sensing can be extended to cooperative sensing, where local space-time-frequency sensing results are combined by multiple CRs. The sensing can be performed in a cooperative manner, while the processing and the assignment of available frequency bands and directions can be performed centrally.

The space-time-frequency spectrum sensing is applicable to the case of multi-user beamforming at the CR transmitter or receiver, in the same frequency band, as described above.

The space-time-frequency spectrum sensing is applicable to both single carrier (SC) and orthogonal frequency-division multiplexing (OFDM) systems. In the case of SC, sensing over a frequency band is accomplished by changing the carrier frequency of the CR. In the case of OFDM, the same task can be performed by the combination of carrier sensing and monitoring the energy in different subcarriers of a wideband OFDM signal during the sensing phase. In OFDM, the beamforming schemes above can be conducted in each subcarrier.

In the case of space-time-frequency spectrum sensing at a transmitter CR k equipped with an antenna array, the difference between the RF responses of the transmit chains 156 and that of the receive chains 156 can reduce accuracy. This is because the channel matrices contain not only the physical propagation channels, but also the RF responses. To reduce these RF imbalances, hardware calibration and over-the-air calibration can be performed with the assistance of a peer station in the CR network. This can be assisted by media-access control (MAC) signaling.

When spectrum sensing and data transceiving are conducted by different users and different frequency bands, the space-time spectrum sensing can still be applied, but at a reduced sensing accuracy. Because different antenna arrays can experience non-identical fading characteristics, especially for small scale fading, the spatial sensing result can deviate from that experienced by the antennas used for data transceiving. If these two sets of antenna array are substantially colocated, and if spatial sensing results are mainly determined by local scattering and spatial parameters, which can be the same for both arrays, spatial sensing result is still effective.

In the case $N_{S\ldots k}\neq N_k$, the space-time-frequency spectrum sensing results with steering vectors $b_k(f)$ of the dimension $N_{S\ldots} \times 1$, should be converted to steering vectors $b_k'(f)$ of the dimension $N_k \times 1$, before conducting data transceiving. This conversion is conducted in such a manner that the change in the equivalent antenna pattern is minimum. For example, if b(f) is aimed in different directions ($\theta$, $\phi$) as in Equation (5), then $b'_k(f)$ for the updated unused frequency bands is the same form as in Equation (5) with the same spatial parameters ($\theta$, $\phi$).

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting unused frequency bands in a cognitive radio network, comprising the steps of:
   sensing a plurality of frequency bands for RF signals using an antenna array including a plurality of elements coupled to a receive RF chain, in which the plurality of elements are individually controllable;
   sensing, for each frequency band, a plurality of spatial directions for the RF signals using the antenna array including the plurality elements coupled to the receive RF chain; and
   assigning a particular frequency band and a particular direction as an available frequency band and an available direction for transmitting RF signals in a cognitive radio if the RF signals are not sensed in the particular spatial direction for the particular frequency band, in which the RF signals are transmitted by a transmit chain connected to the antenna array.

2. The method of claim 1, further comprising:
   sensing the plurality of spatial directions over different time intervals.

3. The method of claim 1, in which the plurality of spatial directions are sensed by time shifting the RF signals received by the plurality of elements with respect to each other.

4. The method of claim 1, in which the plurality of spatial directions are sensed by phase shifting the RF signals received by the plurality of elements with respect to each other.

5. The method of claim 1, in which the set of spatial directions are orthogonal to each other and further comprising:
   sensing the set of spatial directions at the same time and in the same frequency band.

6. The method of claim 5, in which a number of the spatial directions is equal to a number of the elements.

7. The method of claim 1, in which the sensing and assigning is performed cooperatively by multiple transceivers.

8. The method of claim 1, in which results of the sensing are distributed in a frequency domain.

9. The method of claim 1, in which the distribution uses a media access layer.

10. The method of claim 1, further comprising:
    selecting transmit and receive beamforming matrices for the available frequency band.

11. The method of claim 1, in which the matrices are quantized.

12. The method of claim 1, further comprising:
    calibrating RF imbalance between the receive RF chain and a transmit RF chain.

13. The method of claim 1, in which the sensing and transmitting are separated in different time durations.

14. The method of claim 1, in which the sensing and transmitting are conducted simultaneously at different frequency bands.

15. The method of claim 1, in which the receive RF chain is operated according to a matrix RxBF, and the transmit RF chain is operated according to a matrix TXBF, and in which the matrices are combined as an equivalent channel matrix for a MIMO network.

16. The method of claim 1, in which the receive RF chain is operated according to a matrix RxBF, and a transmit RF chain is operated according to a matrix TXBF, and in which the matrices are combined as an equivalent channel matrix for multi-user network.

17. The method of claim 1, in which the assigning is performed at a centralized location.

18. The method of claim 1, in which multiple transmit chains transmit the RF signals in the same available frequency band using time multiplexing.

19. The method of claim 1, in which each frequency band includes a set of subcarriers, and the sensing and assigning is performed for each subcarrier for the plurality of directions.

* * * * *